(12) United States Patent
Chandra et al.

(10) Patent No.: US 8,171,386 B2
(45) Date of Patent: May 1, 2012

(54) SINGLE EVENT UPSET ERROR DETECTION WITHIN SEQUENTIAL STORAGE CIRCUITRY OF AN INTEGRATED CIRCUIT

(75) Inventors: Vikas Chandra, San Jose, CA (US); Sachin Satish Idgunji, San Jose, CA (US)

(73) Assignee: ARM Limited, Cambridge (GB)

( * ) Notice: Subject to any disclaimer, the term of this patent is extended or adjusted under 35 U.S.C. 154(b) by 1044 days.

(21) Appl. No.: 12/078,189

(22) Filed: Mar. 27, 2008

(65) Prior Publication Data

US 2009/0249175 A1 Oct. 1, 2009

(51) Int. Cl.
*G06F 11/00* (2006.01)

(52) U.S. Cl. ....................................... 714/822

(58) Field of Classification Search .................. 714/11, 714/12, 822
See application file for complete search history.

(56) References Cited

U.S. PATENT DOCUMENTS

| | | | |
|---|---|---|---|
| 3,893,070 A | | 7/1975 | Bossen et al. |
| 3,905,023 A | | 9/1975 | Perpiglia |
| 4,227,175 A | * | 10/1980 | Newman ................. 340/146.2 |
| 4,339,657 A | | 7/1982 | Larson et al. |
| 4,558,379 A | * | 12/1985 | Hutter et al. ................. 360/32 |
| 4,633,465 A | | 12/1986 | Fitch et al. |
| 4,635,223 A | * | 1/1987 | Boone et al. ................. 714/12 |
| 4,669,092 A | | 5/1987 | Sari et al. |
| 4,756,005 A | | 7/1988 | Shedd |

(Continued)

FOREIGN PATENT DOCUMENTS

EP 0 366 331 5/1990

(Continued)

OTHER PUBLICATIONS

S. Mitra et al, "Logic Soft Errors in Sub-65nm Technologies Design and CAD Challenges" *DAC 2005*, Jun. 2005, pp. 2-4.

(Continued)

*Primary Examiner* — Marc Duncan
(74) *Attorney, Agent, or Firm* — Nixon & Vanderhye, PC

(57) ABSTRACT

Sequential storage circuitry for a integrated circuit is provided, comprising a first storage element, a second storage element and an additional storage element. The first storage element stores, during a first phase of a clock signal, a first indication of an input data value received by the sequential storage circuitry. The second storage element is coupled to an output of the first storage element, and stores a second indication of the input data value during a second phase of the clock signal. The additional storage element is driven by a pulse signal derived from the clock signal, and is arranged on occurrence of that pulse signal to store a third indication of the input data value. Error detection circuitry is then provided for detecting a single event upset error in either the first storage element or the second storage element. In particular, during the first phase of the clock signal, the error detection circuitry detects the single event upset error in the first storage element if there is a difference in the input data value as indicated by the first indication and the third indication. Further, during the second phase of the clock signal, the error detection circuitry detects a single event upset error in the second storage element if there is a difference in the input data value as indicated by the second indication and the third indication. Such an arrangement provides a simple mechanism for detecting soft errors in both the first storage element and the second storage element using only one additional storage element.

12 Claims, 8 Drawing Sheets

U.S. PATENT DOCUMENTS

| | | | |
|---|---|---|---|
| 4,833,635 A | 5/1989 | McCanny et al. | |
| 4,885,715 A | 12/1989 | McCanny et al. | |
| 4,918,709 A | 4/1990 | Fitch | |
| 4,975,930 A | 12/1990 | Shaw | |
| 5,043,990 A | 8/1991 | Doi et al. | |
| 5,203,003 A | 4/1993 | Donner | |
| 5,276,690 A | 1/1994 | Lee et al. | |
| 5,291,496 A | 3/1994 | Andaleon et al. | |
| 5,313,625 A | 5/1994 | Hess et al. | |
| 5,321,705 A | 6/1994 | Gould et al. | |
| 5,400,370 A | 3/1995 | Guo | |
| 5,402,273 A | 3/1995 | Tucker | |
| 5,408,200 A | 4/1995 | Buhler | |
| 5,414,722 A * | 5/1995 | Tollum | 714/822 |
| 5,426,746 A | 6/1995 | Sekiguchi | |
| 5,455,536 A | 10/1995 | Kono et al. | |
| 5,463,351 A | 10/1995 | Marko et al. | |
| 5,504,859 A | 4/1996 | Gustafson et al. | |
| 5,509,076 A * | 4/1996 | Sprunk | 713/189 |
| 5,528,637 A | 6/1996 | Sevenhans et al. | |
| 5,553,232 A | 9/1996 | Wilhite et al. | |
| 5,572,662 A | 11/1996 | Ohta et al. | |
| 5,615,263 A | 3/1997 | Takahashi | |
| 5,625,652 A | 4/1997 | Petranovich | |
| 5,627,412 A | 5/1997 | Beard | |
| 5,630,154 A | 5/1997 | Bolstad et al. | |
| 5,737,369 A | 4/1998 | Retzer | |
| 5,859,551 A | 1/1999 | Ohishi et al. | |
| 5,862,141 A | 1/1999 | Trotter | |
| 5,870,446 A | 2/1999 | McMahan et al. | |
| 5,872,907 A | 2/1999 | Griess et al. | |
| 5,896,391 A | 4/1999 | Solheim et al. | |
| 5,914,903 A | 6/1999 | Kanma et al. | |
| 6,067,256 A | 5/2000 | Yamashita et al. | |
| 6,076,175 A | 6/2000 | Drost et al. | |
| 6,078,627 A | 6/2000 | Crayford | |
| 6,114,880 A | 9/2000 | Buer et al. | |
| 6,127,864 A * | 10/2000 | Mavis et al. | 327/144 |
| 6,148,423 A | 11/2000 | Le Mouel et al. | |
| 6,167,526 A | 12/2000 | Carlson | |
| 6,173,423 B1 | 1/2001 | Autechaud et al. | |
| 6,188,610 B1 | 2/2001 | Kakizoe et al. | |
| 6,222,660 B1 | 4/2001 | Traa | |
| 6,282,661 B1 | 8/2001 | Micol | |
| 6,453,431 B1 | 9/2002 | Bernstein et al. | |
| 6,476,643 B2 * | 11/2002 | Hugues et al. | 326/93 |
| 6,523,201 B1 | 2/2003 | De Michele | |
| 6,650,661 B1 | 11/2003 | Buchanan et al. | |
| 6,693,985 B2 | 2/2004 | Li et al. | |
| 6,741,110 B2 | 5/2004 | Roisen | |
| 6,772,388 B2 | 8/2004 | Cooper et al. | |
| 6,799,292 B2 | 9/2004 | Takeoka et al. | |
| 6,802,033 B1 | 10/2004 | Bertin et al. | |
| 6,831,496 B2 | 12/2004 | Gardner | |
| 6,834,367 B2 | 12/2004 | Bonneau et al. | |
| 6,907,553 B2 | 6/2005 | Popplewell et al. | |
| 6,931,565 B2 * | 8/2005 | Hirabayashi | 714/4.1 |
| 6,944,067 B2 | 9/2005 | Mudge et al. | |
| 6,944,468 B2 | 9/2005 | Okumura | |
| 6,958,627 B2 | 10/2005 | Singh et al. | |
| 6,977,910 B1 | 12/2005 | Hosur et al. | |
| 6,985,547 B2 | 1/2006 | Uht | |
| 7,002,358 B2 | 2/2006 | Wyatt | |
| 7,010,074 B2 | 3/2006 | Nakamura | |
| 7,023,235 B2 | 4/2006 | Hoff | |
| 7,046,056 B2 | 5/2006 | Kizer et al. | |
| 7,061,294 B1 | 6/2006 | Talledo et al. | |
| 7,073,080 B2 | 7/2006 | Lou | |
| 7,085,993 B2 | 8/2006 | Goodnow et al. | |
| 7,096,137 B2 | 8/2006 | Shipton et al. | |
| 7,096,402 B2 | 8/2006 | Yano et al. | |
| 7,116,744 B2 | 10/2006 | Saze et al. | |
| 7,142,623 B2 | 11/2006 | Sorna | |
| 7,162,661 B2 | 1/2007 | Mudge et al. | |
| 7,188,284 B2 | 3/2007 | Mitra et al. | |
| 7,236,555 B2 | 6/2007 | Brewer | |
| 7,257,173 B2 | 8/2007 | Wood et al. | |
| 7,260,742 B2 * | 8/2007 | Czajkowski | 714/21 |
| 7,278,074 B2 | 10/2007 | Mitra et al. | |
| 7,278,076 B2 | 10/2007 | Zhang et al. | |
| 7,278,080 B2 | 10/2007 | Flautner et al. | |
| 7,310,755 B2 | 12/2007 | Mudge et al. | |
| 7,320,091 B2 | 1/2008 | Blaauw et al. | |
| 7,323,946 B2 | 1/2008 | Seefeldt et al. | |
| 7,337,356 B2 | 2/2008 | Mudge et al. | |
| 7,401,273 B2 * | 7/2008 | Lee et al. | 714/724 |
| 7,482,831 B2 | 1/2009 | Chakraborty et al. | |
| 7,546,519 B2 | 6/2009 | Agarwal | |
| 7,594,150 B2 | 9/2009 | Chakraborty et al. | |
| 7,650,551 B2 | 1/2010 | Flautner et al. | |
| 7,671,627 B1 | 3/2010 | Somani et al. | |
| 7,782,125 B2 * | 8/2010 | Shimura | 327/544 |
| 7,797,575 B2 * | 9/2010 | Clark et al. | 714/11 |
| 2001/0016927 A1 * | 8/2001 | Poisner | 714/718 |
| 2002/0038418 A1 | 3/2002 | Shimamura | |
| 2004/0130351 A1 * | 7/2004 | Hazucha et al. | 327/15 |
| 2004/0199821 A1 | 10/2004 | Flautner et al. | |
| 2005/0162185 A1 | 7/2005 | Satsukawa | |
| 2007/0028157 A1 | 2/2007 | Drake et al. | |
| 2010/0088565 A1 * | 4/2010 | Chandra | 714/746 |
| 2011/0126051 A1 * | 5/2011 | Flautner et al. | 714/30 |

FOREIGN PATENT DOCUMENTS

| | | |
|---|---|---|
| EP | 0 374 420 | 6/1990 |
| EP | 0 653 708 | 5/1995 |
| JP | 60-20398 | 2/1985 |
| JP | 62-24498 | 2/1987 |
| JP | 2001-175542 | 6/2001 |
| SU | 809350 | 2/1981 |
| WO | WO 00/54410 | 9/2000 |
| WO | WO 01/46800 | 6/2001 |
| WO | WO 2004/084072 | 9/2004 |

OTHER PUBLICATIONS

P. Hazucha et al, "Measurements and Analysis of SER-Tolerant Latch in a 90-nm Dual-$V_T$ CMOS Process" *IEEE Journal of Solid-State Circuits*, vol. 39, No. 9, Sep. 2004, pp. 1536-1543.

S. Mitra et al, "Robust System Design with Built-In Soft-Error Resilience" IEEE Computer Society Feb. 2005, pp. 43-52.

M. Keating et al, "Low Power Methodology Manual for System-on-Chip Design" p. 216.

Co-pending U.S. Appl. No. 11/636,716, filed Dec. 11, 2006, S. Das et al.

U.S. Appl. No. 12/285,517, filed Oct. 7, 2008, Chandra.

U.S. Appl. No. 12/461,740, filed Aug. 21, 2009, Blaauw et al.

U.S. Appl. No. 12/923,911, filed Oct. 13, 2010, Flautner et al.

U.S. Appl. No. 12/923,908, filed Oct. 13, 2010, Flautner et al.

U.S. Appl. No. 12/926,084, filed Oct. 25, 2010, Flautner et al.

U.S. Appl. No. 13/064,207, filed Mar. 10, 2011, Choudhury et al.

Office Action mailed Jun. 23, 2010 in co-pending U.S. Appl. No. 11/636,716.

Office Action mailed Aug. 3, 2011 in co-pending U.S. Appl. No. 12/923,911.

Final Office Action mailed Dec. 7, 2010 in co-pending U.S. Appl. No. 11/636,716.

Office Action mailed Jul. 13, 2011 in co-pending U.S. Appl. No. 11/636,716.

M. Zhang et al, "Sequential Element Design With Built-In Soft Error Resilience" *IEEE Transactions on Very Large Scale Integration (VLSI) Systems*, vol. 14, No. 12, Dec. 2006, pp. 1368-1378.

A.J. Drake et al, "A Self-Correcting Soft Error Tolerant Flop-Flop" 12th NASA Symposium on VLSI Design, Oct. 2005.

V. Chandra et al, "Impact of Technology and Voltage Scaling on the Soft Error Susceptibility in Nanoscale CMOS" *DFTVS '08*, IEEE International Symposium on Defect and Fault Tolerances of VLSI Systems, 2008.

Hill et al. "An Accurate Flip-Flop Selection Technique for Reducing Logic SER", *Dept. of Electrical and Computer Engineering—Univ. of Wisconsin*, No Date, pp. 1-9.

Rockett, "An SEU-Hardened CMOS Data Latch Design", *IEEE Transactions on Nuclear Sciences*, vol. 35, No. 6, Dec. 1998, pp. 1682-1687.

Karnik et al., "Characterization of Soft Errors Caused by Single Event Upsets in CMOS Processes", *IEEE Transactions on Dependable and Secure Computing*, vol. 1, No. 2, Apr. 2004, pp. 128-143.

Li et al., "Low Power Dissipation SEU-hardened CMOS Latch", *PIERS Online*, vol. 3, No. 7, 2007, pp. 1080-1084.

Dabiri et al., "Soft Error-Aware Power Optimization using Gate Sizing", *Computer Science Dept.—Univ. of California*, No Date, pp. 1-10.

Zhang et al., "Design for Resilience to Soft Errors and Variations", *IEEE Computer Society*, 2007, 6 pages.

Huang et al., "A New Radiation Hardened by Design Latch for Ultra-Deep-Sub-Micron Technologies", *IEEE Computer Society*, 2008, pp. 175-176.

Das et al., "RazorII: In Situ Error Detection and Correction for PVT and SER Tolerance", *IEEE Journal of Solid-State Circuits*, vol. 44, No. 1, Jan. 2009, pp. 32-48.

Jagirdar et al., "A Robust Architecture for Flip-Flops Tolerant to Soft-Errors and Transients from Combinational Circuits", *IEEE Computer Society*, 2008, pp. 39-44.

Calin et al., "Upset Hardened Memory Design for Submicron CMOS Technology", *IEEE Transactions on Nuclear Science*, vol. 43, No. 6, Dec. 1996, pp. 2874-2878.

Naseer et al., "DF-DICE: A Scalable Solution for Soft Error Tolerant Circuit Design", *ISCAS* 2006, pp. 3890-3893.

Jargirdar et al., "Efficient Flip-Flop Designs for SET/SEU Mitigation with Tolerance to Crosstalk Induced Signal Delays", *Rutgers University*, 24 pages.

Giacomotto et al., "Energy Efficiency of Power-Gating in Low-Power Clocked Storage Elements", *PATMOS Proceedings*, No Date, 9 pages.

Goel et al, "Low-Overhead Design of Soft-Error-Tolerant Scan Flip-Flops with Enhanced-Scan Capability", *IEEE*, 2006, pp. 665-670.

S. Das, "Razor: A Variability-Tolerant Design Methodology for Low-Power and Robust Computing", *Computer Science and Engineering—Univ. of Michigan*, 2009, pp. 1-122.

K. Seshadri, "Reduction of Architecture Vulnerability Factor using Modified Razor Flip-flops", *Dept. of Electrical and Computer Engineering—Univ. of Maryland*, 2007, pp. 1-61.

Calin et al, "Upset-Tolerant CMOS SRAM Using Current Monitoring: Prototype and Test Experiments", *International Test Conference IEEE 1995*, pp. 45-53.

A. Venkatraman et al, "A Robust, Fast Pulsed Flip-Flip Design" *GLSVLSI'08*, May 2008, pp. 119-122.

S. Mitra et al, "Built-In Soft Error Resilience for Robust System Design" IEEE, 2007, pp. 1-6.

S. Mitra "Built-In Soft Error Resilience for Robust System Design" power point presentation pp. 1-34 & 36-45 www.ewh.ieee.org/r6/scv/rl/articles/ser.talk.grid.v1.pdf.

N. Kanekawa et al, "Fault Detection and Recovery Coverage Improvement by Clock Synchronized Suplicated Systems with Optimal Time Diversity" *Fault-Tolerant Computing*, Jun. 1998, pp. 196-200.

"ARM710 Data Sheet" Dec. 1994, Advanced RISC Machines Ltd. (ARM).

F. Worm et al, "An Adaptive Low-Power Transmission Scheme for On-Chip Networks" *ISSS'02*, Oct. 2002, pp. 92-100.

Enomoto et al, "A low-power, high speed 0.25 μm GaAs D-FF" Proceedings of the 23$^{rd}$ European Solid-State Circuits Conference, 1997, ESSCIRC '97, Sep. 16-18, 1997, pp. 300-303.

R. Oliveira et al, "A TMR Scheme for SEU Mitigation in Scan Flip-Flops" 8$^{th}$ International Symposium on Quality Electronic Design 2007 (ISQED '07) pp. 905-910, Mar. 26-28, 2007.

S.V. Devarapalli et al, "SEU-hardened Dual Data Rate Flip-Flop Using C-elements" IEEE 25$^{th}$ International Symposium on Defect and Fault Tolerance in VLSI Systems (DFT) 2010, pp. 167-171, Oct. 6-8 2010.

* cited by examiner

SINGLE EVENT UPSET ERROR DETECTION WITHIN SEQUENTIAL STORAGE CIRCUITRY OF AN INTEGRATED CIRCUIT

BACKGROUND OF THE INVENTION

1. Field of the Invention

This invention relates to the detection of single event upset errors within sequential storage circuitry of integrated circuits, such as those which arise from neutron and alpha particle strikes.

2. Description of the Prior Art

A Single Event Upset (SEU) (also known as a soft error) is a change in state or a transient voltage pulse at sensitive nodes in integrated circuits, such as processors. SEUs occur due to high energy neutron or alpha particle strikes on the silicon substrate of processors. Errors can occur due to SEU if it leads to a state flip in the state-holding elements that determine the architectural state of the integrated circuit, such as the RAM arrays, the Register File, the architectural-state registers of a processor, or the flip-flops and latches within control logic. In the context of this document, we consider an error due to SEU as a state flip in any state-holding element inside the integrated circuit. As device geometries are shrinking, integrated circuits are becoming more prone to soft errors, as for example is discussed in the article "Logic Soft Errors in Sub-65 nm Technologies Design and CAD Challenges" by S Mitra et al, Design Automation Conference, 2005.

The traditional technique of protection of RAM arrays and architectural state registers against particle strikes on their state holding nodes is through the use of Error Correcting Codes, or ECC. In accordance with such a technique an ECC block implements a standard algorithm on the block of data to be written in order to generate a, so-called, "code". The code corresponding to the input data and the data itself are then both written into the memory. During a read operation, both the data and its code are read out. The ECC block then recomputes the code for the data and compares that to the code already read out. If the "recomputed" code does not match with the "read" code, then it is indicative of a state flip inside the RAM array. Such an event is flagged as an error.

With standard ECC algorithms, it is possible to correct an erroneous block of data, albeit with additional computational and storage overhead. If the error occurs in only a single bit of the data, then the overhead of correction using ECC is reasonable. However, the ability to detect and correct errors in multiple bits requires fairly sophisticated ECC algorithms with prohibitive computational and storage overhead. Hence, the typical practice is to use ECC for double-bit error detection and single-bit error correction.

Since Single Event Upsets inside RAM memories typically cause single bit flips, and due to the high density of RAM memory in current generation integrated circuits, ECC is a very effective error detection and correction technique for RAM memory protection. However, the same technique cannot be applied to sequential storage circuitry such as latches and flip-flops, due to their spatial distribution throughout the integrated circuit, and due to the fact that neutron and particle strikes in such distributed logic (as opposed to RAM memory) can cause separate bit failures within multiple of the sequential storage circuits, which ECC cannot correct.

Over the last few years many techniques have been proposed for detecting soft errors in sequential storage circuitry, see for example the earlier-mentioned article "Logic Soft Errors in Sub-65 nm Technologies Design and CAD Challenges" by S Mitra et al, Design Automation Conference, 2005, the article "Measurements and Analysis of SER-tolerant latch in a 90-nm Dual $V_T$ CMOS Process", by P Hazucha et al, IEEE Custom Integrated Circuits Conference (CICC) 2003, and the article "Robust System Design with Built-In Soft Error Resilience", by S Mitra et al, IEEE Computer, February 2005.

Generally these approaches involve using alternative flip-flop architectures that are designed for SEU robustness. The main concept in these known designs is to reduce the likelihood of state corruption in latching elements by one of: increasing the overall capacitance on the latching node so as to decrease the likelihood of a state flip (the charge required to upset the state will be more with increased capacitance); overdriving the latching nodes through active devices to fight against state flips; or providing for redundancy in the latching elements and additional voting circuitry to choose between their outputs (such as for example in a "Triple Module Redundancy" (TMR) scheme where the latching elements are replicated three times and a voting is performed to output the data value held by the majority).

These known circuit-based techniques for SEU robustness require duplication or triplication of state-holding elements within a flip-flop in order to reduce the likelihood of an error occurring due to an SEU. These known techniques hence disadvantageously increase the amount of circuit area needed and the power consumed.

An SEU tolerant flip-flop has been discussed in co-pending commonly owned U.S. patent application Ser. No. 11/636,716, in connection with a design technique sometimes referred to as "Razor". The Razor technique is described in US Published Patent Application 2004-0199821 and allows voltage safety margins providing for uncertainties in silicon and ambient conditions to be eliminated or reduced. In general, the Razor technique involves adjusting the operating parameters of an integrated circuit, such as the clock frequency, the operating voltage, the body bias voltage, temperature and the like so as to maintain a finite non-zero error rate in a manner that increases overall performance. Errors are detected in the processing stages by comparison of a non-delayed data value with a delayed data value. These data values are captured at slightly different times. US Published Patent No. 2005/246613 describes a transition detecting flip-flop that can be used to detect timing errors when employing Razor techniques. Timing errors occur in a Razor-like system when propagation delay through combinatorial logic causes the data input to an edge-triggered sequential element, such as a flip-flop, to violate setup requirements. Data may change state in the setup or the hold window causing metastability in the sequential element, or it may transition after the positive edge such that the sequential element captures incorrect state data. Razor error detection is provided augmenting each timing critical sequential element with a transition detector. The transition detector flags any transition on the data input of the sequential element in the setup time window and during the positive phase of the clock.

The SEU tolerant flip-flop described in the above-mentioned U.S. patent application Ser. No. 11/636,716 involves storing a sampled input signal within a sequential storage element, and then using combinatorial logic to detect as an error a transition of the signal stored by said sequential storage element occurring at a time outside a valid transition period. The technique recognises that a single event upset error can be detected at a circuit level using techniques similar to the above described Razor techniques. In particular, a sequential storage element for sampling an input signal and then storing that input signal as a stored signal will have a relatively short window of time in which it will be expected that a valid transition within the stored signal can occur.

Transitions in the stored signal outside of this valid transition period can be detected as errors and single event upset errors have a high probability of manifesting themselves in this way.

Whilst such an approach can operate well in a specialised razor type system, it is not readily used in a more general system design. In particular the minimum delay constraint (the requirement for the input signal not to change during the positive phase of the clock) has to be met for all SEU tolerant flip-flops employing the above design, thereby putting a stringent requirement on the hold constraint. This has knock on effects, for example it is difficult to use a scan chain in association with such flip-flops, unless an asymmetric duty cycle clock is used. Accordingly whilst this approach can work well in certain systems, the constraints that are associated with it will not be acceptable in many systems and hence limit its general applicability.

Accordingly, it would be desirable to provide an improved technique for detecting SEUs in sequential storage circuitry of an integrated circuit, which can be used in a wide variety of systems.

SUMMARY OF THE INVENTION

Viewed from a first aspect, the present invention provides sequential storage circuitry for an integrated circuit, comprising: a first storage element for storing, during a first phase of a clock signal, a first indication of an input data value received by the sequential storage circuitry; a second storage element coupled to an output of the first storage element, for storing a second indication of the input data value during a second phase of the clock signal; an additional storage element for storing a third indication of the input data value on occurrence of a pulse signal derived from the clock signal; and error detection circuitry for detecting a single event upset error in either the first storage element or the second storage element by: (i) during the first phase of the clock signal, detecting the single event upset error in the first storage element if there is a difference in the input data value as indicated by said first indication and said third indication; and (ii) during the second phase of the clock signal, detecting the single event upset error in the second storage element if there is a difference in the input data value as indicated by said second indication and said third indication.

In accordance with the present invention, single event upset errors occurring in either the first storage element or the second storage element of the sequential storage circuitry can be detected using only one additional storage element, whereas without the use of the present invention it would be necessary to either use separate additional storage elements for the first and second storage elements, or to limit detection to only one of the first and second storage elements. In accordance with the present invention, the additional storage element is driven by a pulse signal derived from the clock signal used to control the first and second storage elements. More particularly, on occurrence of such a pulse signal, the additional storage element stores an indication of the input data value received by the sequential storage circuitry. Error detection circuitry is then used to detect a single event upset error in either the first storage element or the second storage element. In particular, during the first phase of the clock signal the error detection circuitry can detect a single event upset error in the first storage element by detecting a situation where the contents of the first storage element and the additional storage element do not identify the same input data value. Similarly, during the second phase of the clock signal, the error detection circuitry can detect a single event upset error in the second storage element by detecting a situation where the contents of the second storage element and the additional storage element do not identify the same input data values.

During each clock cycle, the contents of the additional storage element will typically be updated once based on the generated pulse signal, and the stored content in that additional storage element can then be used to detect errors in both the first storage element and the second storage element.

The first and second storage elements can take a variety of forms. However, considering sequential storage circuitry in the form of a flip-flop, the first storage element can for example form the master latch, and the second storage element can form the slave latch of the flip-flop.

Whilst the earlier mentioned Razor-based SEU tolerant flip-flop uses combinatorial logic which can detect soft errors in both phases of the clock cycle, it places significant design constraints on the system in which it is used, for example the minimum delay constraint that the data cannot change during the positive phase of the clock. In the present invention, there is no need for the combinatorial logic used in the Razor-based flip-flop, and instead a simple additional storage element driven by a pulse signal is used to provide error detection in both a first storage element and a second storage element, without placing any minimum delay constraint on the system design in which the sequential storage circuitry is used.

On detection of a single event upset error in either the first storage element or the second storage element, the error detection circuitry can be arranged to generate an error signal, and this error signal can then be used at the system level to flush the error or to take any other appropriate action. However, there is a window of vulnerability where an error can go undetected, this window of vulnerability depending on where the pulse signal appears with respect to the clock signal. Accordingly, in one embodiment, the error detection circuitry is arranged to suppress generation of the error signal during the occurrence of the pulse signal. This can be achieved by preventing the error detection circuitry taking any error detecting steps during that brief period, or by merely gating the output of the error detection circuitry, such that any error detected in that brief period does not give rise to an asserted error signal.

In one embodiment, the pulse signal is generated in response to the start of the first phase of the clock signal, and no error signal is produced for any single event upset error occurring in the first storage element during occurrence of the pulse signal. Hence, in this embodiment there is a small period of time during which a soft error in the first storage element is undetected. However, for the remainder of the first phase of the clock signal, and for all of the second phase of the clock signal, the error detection circuitry can detect any single event upsets occurring.

It will be appreciated that the first phase can be chosen to be either the logic one, high, phase of the clock signal, or the logic zero, low, phase of the clock signal, dependent on implementation, with the second phase then being the logic zero or logic one phase, respectively. Considering an example where the first phase of the clock signal is the logic one phase, and the second phase of the clock signal is the logic zero phase, then in one embodiment the pulse signal can be triggered from the rising edge of the clock signal, i.e. the start of the first phase of the clock signal. Hence, the small window of vulnerability occurs right at the beginning of the first phase of the clock signal.

However, it is not a requirement for the pulse signal to be generated at the beginning of the first phase of the clock signal. For example, in an alternative embodiment, the pulse signal is generated just prior to the end of the second phase of the clock signal, and no error signal is produced for any single event upset error occurring in the second storage element during occurrence of the pulse signal. One simple way to achieve this within a system where the first phase of the clock signal is the logic one phase and the second phase of the clock signal is the logic zero phase, is to arrange both the first storage element and the second storage element to operate off a slightly delayed clock signal. In this embodiment, the pulse signal can still be triggered by the rising edge of the original clock signal, but due to the first and second storage elements operating off a slightly delayed clock signal (delayed by the duration of the pulse signal), this has the effect that the pulse signal is generated just prior to the end of the second phase. Hence, in such embodiments, any soft errors occurring in the first storage element will be detected, and any soft errors occurring in the second storage element, other than for a short period just prior to the end of the second phase, will also be detected. The advantage of such an approach is that if a neutron or alpha particle strike happens during this vulnerable period at the end of the second phase, then there will typically not be time for that corrupted data to then propagate through the combinatorial logic at the output of the sequential storage circuit, and on to the next sequential storage circuit on the other side of the combinatorial logic, and hence the error is unlikely to be propagated within the system. However, a slight disadvantage of this scheme is that the hold time of the sequential storage circuit will increase by the amount that the clock signal is delayed.

To enable the technique of the present invention to be employed, it is necessary to provide the additional storage element in addition to the first and second storage elements typically found within sequential storage circuitry. However, in one embodiment, this additional storage element can actually be provided by an existing storage element provided for a different purpose. In particular, in low power designs, it is known to provide a retention latch within a flip-flop (sometimes referred to as a balloon latch) which can be used to store the input data when the majority of the sequential storage circuit is powered down. This extra latch in the flip-flop design is powered by a separate voltage supply which is always powered on. In one embodiment, this existing retention latch can be used to implement the additional storage element of the present invention, thereby significantly reducing the overhead in such designs. An example of a retention flip-flop including such a retention latch is described in the book "Low Power Methodology Manual For System-on-Chip Design" by M Keating et al, Springer 2007, page 216.

In one such embodiment, the additional storage element is operable in either a single event upset error detection mode or a state retention mode. In the single event upset error detection mode the additional storage element stores the third indication of the input data value on occurrence of the pulse signal derived from the clock signal, and in the state retention mode, the additional storage element is arranged to store an indication of the input data value when power is removed from the first and second storage elements but not the additional storage element, the error detection circuitry not being used in the state retention mode.

If a neutron or alpha particle strike hits the additional storage element, then the error detection circuitry will still detect an error, and in this case an error will be flagged even when there is no real state corruption (the system as a whole is only concerned with the data stored in the first and second storage elements and does not make use of the data stored in the additional storage element). In one embodiment, to reduce the instances of such false error detection situations, the additional storage element may be designed to be robust to single event upset errors, thereby reducing the likelihood of the error detection circuitry detecting a difference in the input data value due to a single event upset error occurring in the additional storage element. Since this additional storage element is not on the critical path, various known techniques can be used to make it more robust to soft errors without any performance penalty. For example, the additional storage element can be made bigger, or it can be run at a higher voltage, thereby exponentially reducing the probability of a flip of state due to a neutron or alpha particle strike.

In one embodiment where the generation of an error signal is suppressed during the occurrence of the pulse signal, then the value of the error signal output by the error detection circuitry is latched immediately before generation of the pulse signal, to avoid that error signal being lost. Hence, in such an embodiment, the error detection circuitry can suppress generation of the error signal merely by gating the output so that during the occurrence of the pulse signal it is set to a value indicating no error (for example set to a logic zero level if a logic one level is used to indicate the presence of an error).

There are a number of ways in which the error detection circuitry can be arranged to receive an indication of the contents of the first and second storage elements to enable it to perform its error detection analysis. However, in one embodiment, the error detection circuitry is coupled to an output of the second storage element, and during the first phase of the clock signal, the second storage element is transparent such that the output of the second storage element during the first phase of the clock cycle represents the first indication of the data value stored in the first storage element, whereby the error detection circuitry is arranged to detect a single event upset error in the first storage element during said first phase of the clock signal. During the second phase of the clock signal, the second storage element is opaque such that the output of the second storage element during the second phase of the clock cycle represents the second indication of the data value stored in the second storage element, whereby the error detection circuitry is arranged to detect a single event upset error in the second storage element during said second phase of the clock signal.

By such an approach, the error detection circuitry need be coupled only to the output of the second storage element and to the output of the additional storage element, and can still detect single event upsets occurring in either the first storage element or the second storage element, due to the second storage element becoming transparent during the first phase of the clock cycle. This provides a particularly simple mechanism for connecting the error detection circuitry to the other elements of the sequential storage circuitry.

The pulse generation circuitry used to produce the pulse signal used by the additional storage element may in one embodiment be provided locally within the sequential storage circuitry. However, in an alternative embodiment, a separate pulse generation circuitry can be provided externally to the sequential storage circuitry, and indeed the same pulse generation circuitry can then be used to generate pulses for a plurality of sequential storage circuits arranged as described above.

Viewed from a second aspect, the present invention provides an integrated circuit comprising a plurality of sequential storage circuits interposed by combinatorial circuitry, at least one of the sequential storage circuits comprising: a first storage element for storing, during a first phase of a clock signal, a first indication of an input data value received by the sequential storage circuit; a second storage element coupled to an output of the first storage element, for storing a second indication of the input data value during a second phase of the clock signal; an additional storage element for storing a third indication of the input data value on occurrence of a pulse signal derived from the clock signal; and error detection circuitry for detecting a single event upset error in either the first storage element or the second storage element by: (i) during the first phase of the clock signal, detecting the single event upset error in the first storage element if there is a difference in the input data value as indicated by said first indication and said third indication; and (ii) during the second phase of the clock signal, detecting the single event upset error in the second storage element if there is a difference in the input data value as indicated by said second indication and said third indication.

Viewed from a third aspect, the present invention provides a method of detecting a single event upset in sequential storage circuitry of an integrated circuit, the sequential storage circuitry comprising a first storage element, a second storage element coupled to an output of the first storage element, and an additional storage element, the method comprising the steps of: storing in the first storage element, during a first phase of a clock signal, a first indication of an input data value received by the sequential storage circuitry; storing in the second storage element, during a second phase of the clock signal, a second indication of the input data value; storing in the additional storage element, on occurrence of a pulse signal derived from the clock signal, a third indication of the input data value; and detecting a single event upset error in either the first storage element or the second storage element by: (i) during the first phase of the clock signal, detecting the single event upset error in the first storage element if there is a difference in the input data value as indicated by said first indication and said third indication; and (ii) during the second phase of the clock signal, detecting the single event upset error in the second storage element if there is a difference in the input data value as indicated by said second indication and said third indication.

In embodiments of the present invention, it is necessary for a pulse signal to be provided within the sequential storage circuitry in order to drive the additional storage element. In one variant of the present invention, this pulse signal can also be used to enable a simplification of the remaining elements of the sequential storage circuitry, and in particular the first and second storage elements can be replaced by a single main storage element which is also driven in accordance with the pulse signal. The basic SEU error detection mechanism then remains the same.

Thus, in accordance with this alternative aspect of the present invention, sequential storage circuitry for an integrated circuit can be provided, comprising: a main storage element for storing, on occurrence of a pulse signal derived from a clock signal, a first indication of an input data value received by the sequential storage circuitry; an additional storage element for storing, on occurrence of the pulse signal, an additional indication of the input data value; and error detection circuitry for detecting a single event upset error in the main storage element by detecting if there is a difference in the input data value as indicated by said first indication and said additional indication.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
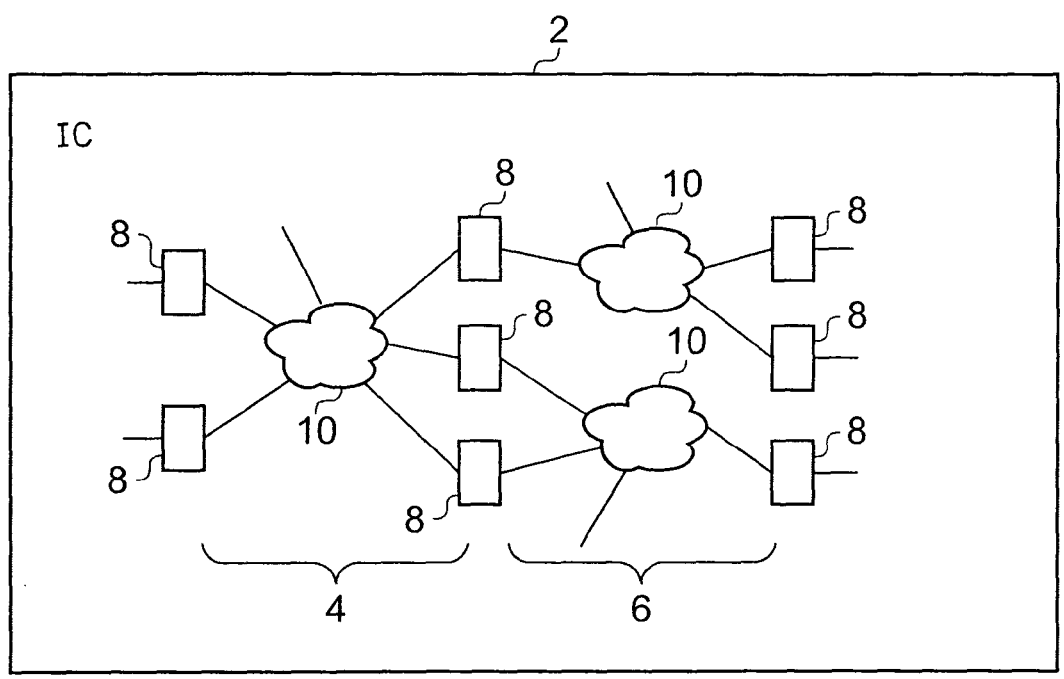
FIG. 1 schematically illustrates an integrated circuit incorporating sequential storage circuits, combinatorial logic and a pipelined architecture.

FIG. 1 shows an integrated circuit 2 including pipeline stages 4, 6 extending between sequential edge-triggered storage circuits 8 which may be in the form of flip-flops. Between the sequential storage circuits 8 are respective instances of combinatorial logic circuitry 10, which serve to receive signals from one or more preceding stages and generate signals to be passed to one or more succeeding stages. The period of time between the capture of signal values by the sequential storage circuits 8 for successive clock periods is the time that is available for the combinatorial logic circuitry 10 to evaluate its inputs so as to generate its outputs. Embodiments of the present invention provide a new design for the sequential storage circuit 8, which can detect SEUs occurring within the sequential storage circuit due to neutron or alpha particle strikes on the sequential storage circuit.

Figure 2:
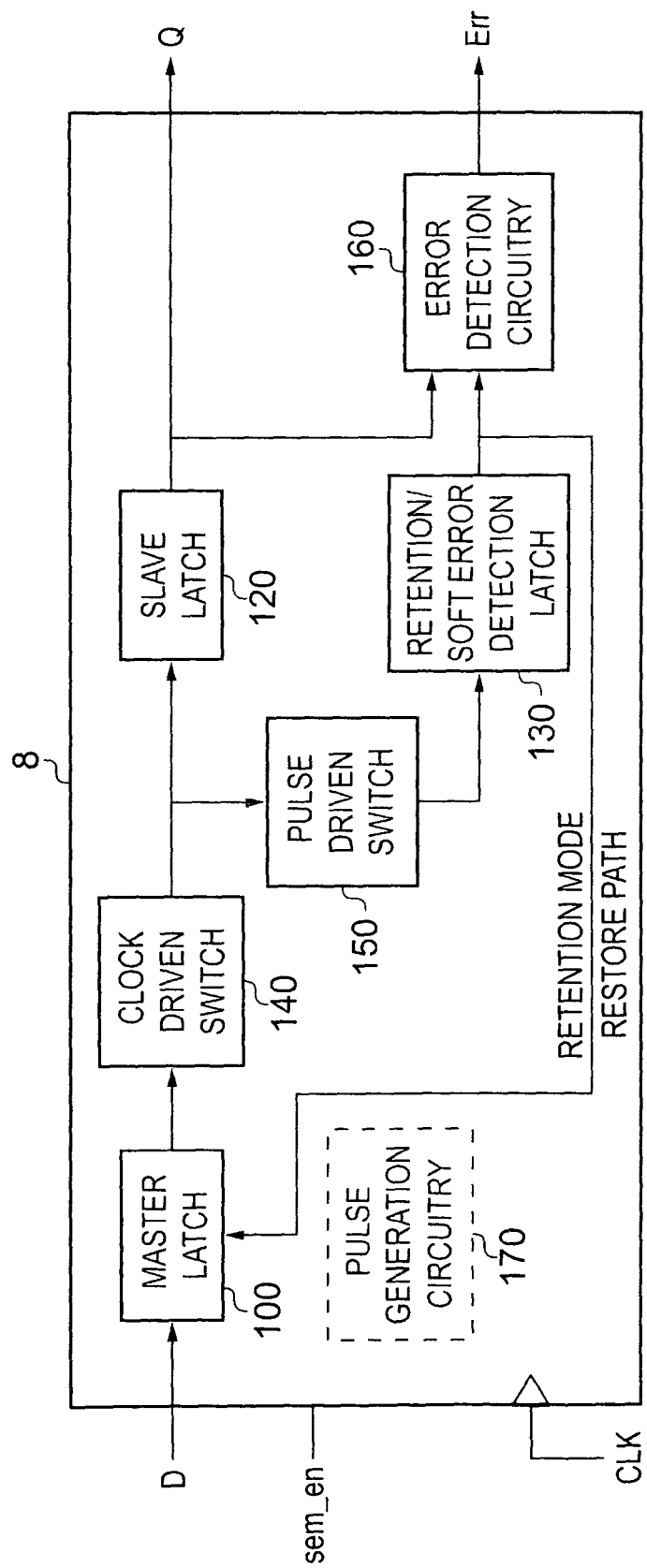
FIG. 2 is a block diagram illustrating the arrangement of a sequential storage circuit in accordance with one embodiment of the present invention.

FIG. 2 is a block diagram schematically illustrating a sequential storage circuit in accordance with a first embodiment of the present invention. The sequential storage circuit comprises a master latch 100 connected in series with a slave latch 120, the master latch 100 receiving an input data value D to the sequential storage circuit, and the slave latch 120 outputting an output value Q from the sequential storage circuit. As will be appreciated by those skilled in the art, the master and slave latches 100, 120 are level-based devices, but by placing them in series the sequential storage circuit 8 then becomes an edge triggered device. In particular, the master latch and slave latch 120 are driven by alternate phases of the clock, such that during a first phase of the clock the master latch 100 stores a first indication of the input data value with the clock driven switch 140 outputting that stored value to the slave latch 120. However, in this first phase of the clock, the slave latch becomes transparent, and merely passes its input through to the output Q without storing any state within the slave latch 120. However, during the second phase of the clock, the master latch 100 becomes transparent, but the clock driven switch 140 turns off, isolating the input to the slave latch 120 from the master latch 100. During the second phase, the slave latch 120 becomes opaque and stores the data value received just prior to the clock driven switch 140 being turned off, providing that stored value as the output value Q.

In accordance with embodiments of the present invention, an additional latch 130 is provided. In one embodiment, this additional latch is provided solely for the purpose of soft error detection, but in an alternative embodiment of the invention, this extra latch 130 can be implemented using a pre-existing retention latch already provided within certain flip-flop designs for low power data retention. Such a retention flip-flop design is described for example in the book "Low Power Methodology Manual for System-On-Chip Design", by M Keating et al, Springer 2007, Page 216. If the additional latch 130 is instantiated by a pre-existing retention latch, then the sequential storage circuit 8 is arranged to receive a single event mode enable (sem_en) signal which can be set to identify whether the sequential storage circuit is operating in soft error detection mode or retention mode.

In soft error detection mode, the additional latch 130 is controlled by a pulse driven switch 150. The pulse driven switch 150 receives a brief pulse signal once per clock cycle, this pulse signal being generated by pulse generation circuitry 170 from the clock signal provided to the sequential storage circuitry 8. In one particular embodiment, the first phase of the clock signal is considered to be the logic one phase, and the second phase is considered to be the logic zero phase, and the pulse generation circuitry 170 generates the pulse on occurrence of the rising edge of the clock signal, (i.e. at the start of the first phase).

The pulse generation circuitry 170 is shown by a dotted box in FIG. 2, since it need not be provided internally within the sequential storage circuitry 8, and in alternative embodiments may be provided externally to the sequential storage circuitry. When provided externally, a single pulse generation circuit can be used to generate a pulse signal for multiple sequential storage circuits arranged as shown in FIG. 2.

On occurrence of the pulse, the pulse driven switch 150 provides the output from the clock driven switch 140 to the latch 130. During the period of the pulse, the latch 130 is arranged to be transparent, and merely passes its input on to the error detection circuitry 160. However, when the pulse ends, the latch 130 becomes opaque and stores the data received from the pulse driven switch. Also, at this time the pulse driven switch turns off to prevent any new value being received by the additional latch 130.

In retention mode, most of the elements within the sequential storage circuit 8 will be powered down, including the master latch 100 and the slave latch 120. However, the additional latch 130 will remain powered, and will store the data value last observed on the path between the master latch and the slave latch at the time the power was removed. On resumption of power to the sequential storage circuit, this data value will then be output over the retention mode restore path to the master latch 100.

As mentioned earlier, there is no requirement for all embodiments of the present invention to provide such a retention mode of operation, and if such a retention mode is omitted, then there will be no need for the retention mode restore path, and indeed there will be no need for the sem_en enable signal, since the sequential storage circuit will be permanently enabled for soft error detection. However, the use of this soft error detection mechanism is particularly advantageous in association with flip-flop designs which already provide such a retention latch, since in those designs there is very little overhead in providing the soft error detection mechanism.

Figure 3:
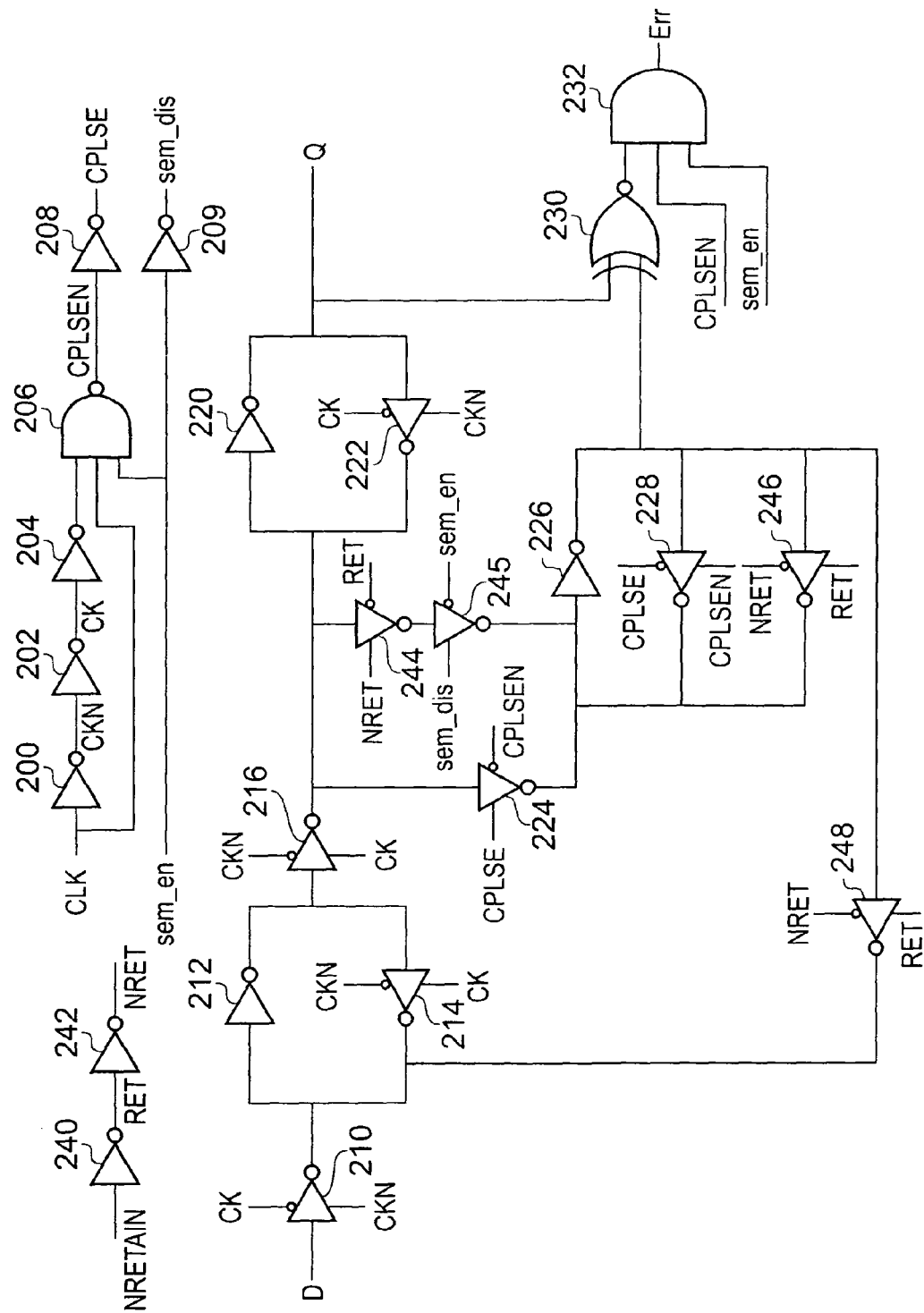
FIG. 3 is a circuit diagram illustrating one particular embodiment of the sequential storage circuit of FIG. 2.

FIG. 3 is a circuit diagram showing one particular implementation of the sequential storage circuit of FIG. 2. In this design, when the sem_en signal is low, the flip-flop works in retention mode, and when the sem_en signal is high, the flip-flop works in soft error detection mode. Since the sem_en signal is provided as one of the inputs to the AND gate 232, it will be appreciated that when the sem_en signal is low (retention mode), no error signal is asserted even if an error is detected.

The circuit elements 200, 202, 204, 206, 208 implement the pulse generation circuitry 170 of FIG. 2. Assuming soft error detection mode is enabled, it will be appreciated that at the moment the clock signal rises from a logic zero to a logic one level, all three inputs to the NAND gate 206 will be at a logic one level, thereby causing the pulse signal (CPLSE) to be asserted at a logic one level. This pulse signal will stay asserted at a logic one level until propagation through the inverters 200, 202, 204 causes the upper input to the NAND gate to transition to a logic zero level, the inverters 200, 202, 204 in effect determining the width of the pulse signal.

Circuit elements 212, 214 form the master latch 100, circuit element 216 forms the clock driven switch 140, circuit elements 220, 222 form the slave latch 120, circuit element 224 forms the pulse driven switch 150, elements 226, 228, 246 form the additional latch 130, and elements 230, 232 form the error detection circuitry 160.

When the clock signal is low, switch 210 is turned on and switches 214, 216 are turned off. In effect, the master latch 100 becomes transparent, but the switch 216 prevents propagation of any input data on to the slave latch. At the moment the clock signal goes high, switch 210 turns off, but switches 214 and 216 turn on. At this point, the master latch 100 becomes opaque and stores a representation of the input data value D as it existed just prior to the switch 210 being turned off. At this time, the switch 222 is turned off, and hence the stored value in the master latch is merely output via elements 216 and 220 as the output value Q.

Since the pulse signal is initiated off the rising edge of the clock, it will be seen that the switch 224 also turns on at this time, but the switch 228 is turned off. Accordingly, the additional latch 130 in effect becomes transparent and the data value is merely routed via elements 224 and 226 to the second input of the exclusive NOR (XNOR) gate 230. However, during this brief period in which the pulse is active, the CPLSEN signal (at a logic zero level) will ensure that the AND gate 232 does not produce any error signal irrespective of any output from the XNOR gate 230.

As soon as the pulse finishes, switch 224 turns off and switch 228 turns on, causing the additional latch 130 to become opaque and store the data value received just prior to the switch 224 turning off. Further, the lower two inputs to the AND gate 232 will now be at a logic one level, and an error signal will be generated if a logic one output is issued by the XNOR gate 230. For the entire remainder of the first phase of the clock cycle, the exclusive NOR gate 230 will in effect be comparing the contents of the master latch 100 with the contents stored in the additional latch 130, and will generate a logic one value if there is any mismatch, such a mismatch indicating the presence of a single event upset in the master latch 100 or the additional latch 130. As will be discussed in more detail below, the additional latch 130 is made robust to soft errors, and accordingly in practice such an error indication will indicate the presence of a soft error in the master latch.

When the clock signal goes low to initiate the start of the second phase of the clock cycle, the switch 216 will turn off, and the switch 222 will turn on, at this point the slave latch 120 becoming opaque and storing the data value last received from the switch 216 before that switch was turned off. It should be noted that no change will occur in respect of the contents of the additional latch 130, and as a result, during the second phase of the clock cycle, the XNOR gate 230 will compare the contents in the slave latch with the contents in the additional latch, and generate a logic one value in the event of any disparity. Therefore, during the second phase of the clock cycle, an error signal will be generated upon detection of any single event error in the slave latch.

It should be noted that an XNOR gate 230 is used rather than an XOR gate, due to the difference in the number of inversions in the two paths. In particular, there are five inversions of the original input signal D through the additional latch path to the second input of the XNOR gate, and only four inversions in the path through the slave latch to the first input of the XNOR gate, thus requiring an XNOR gate rather than an XOR gate to produce the desired operation. It will be appreciated that if in another embodiment the number of inverters on each path were instead to be matched, an XOR gate would be used instead of XNOR gate 230.

In retention mode, the sem_en signal is low, and accordingly no pulse signal is generated. Therefore, switches 224, 228 are not used, and AND gate 232 is disabled. The NRETAIN signal will be set high during normal operation of the retention mode (i.e. when all of the components are powered), which causes the switch 244 to turn on. Further, the switch 245 will be turned on since the sem_en signal will be low, and inverter 209 will accordingly cause the sem_dis signal to go high. Since both switches 244 and 245 are turned on, the data value as observed on the path between the master latch and the slave latch will be passed to the additional latch 130. As an aside, it will be appreciated that the switch 245 prevents this path being used in the soft error detection mode, since in that mode the sem_en signal will be high and switch 245 will be turned off irrespective of the value of the NRETAIN signal.

Whilst the NRETAIN signal is high, switch 246 will be turned off, and accordingly the retention latch will be transparent. However, when the power saving operation of the retention mode is to be entered, the NRETAIN signal goes low, as a result of which switch 244 turns off and switches 246, 248 turn on. Thus, at this time, the retention latch becomes opaque, and stores a representation of the data value as it existed on the path between the master latch and the slave latch just prior to switch 244 turning off. Further, via switch 248, that latched value will be routed back to the master latch.

Accordingly, when the power saving operation is exited, the master latch will be provide with the data value via switch 248, at this point the NRETAIN signal again returning to the high state, causing switches 246, 248 to turn off, and switch 244 to turn back on.

Figure 4:
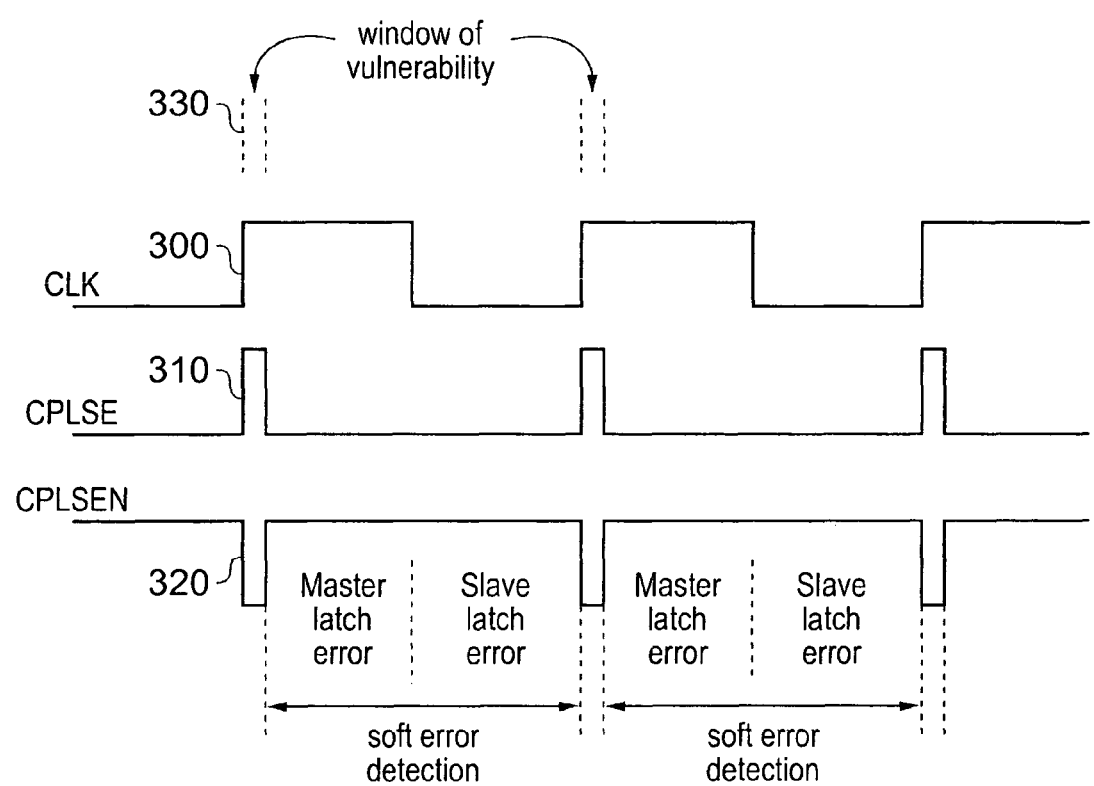
FIGS. 4 and 5 are timing diagrams illustrating windows of vulnerability in accordance with two different pulse based schemes that can be used in embodiments of the present invention.
Figure 5:
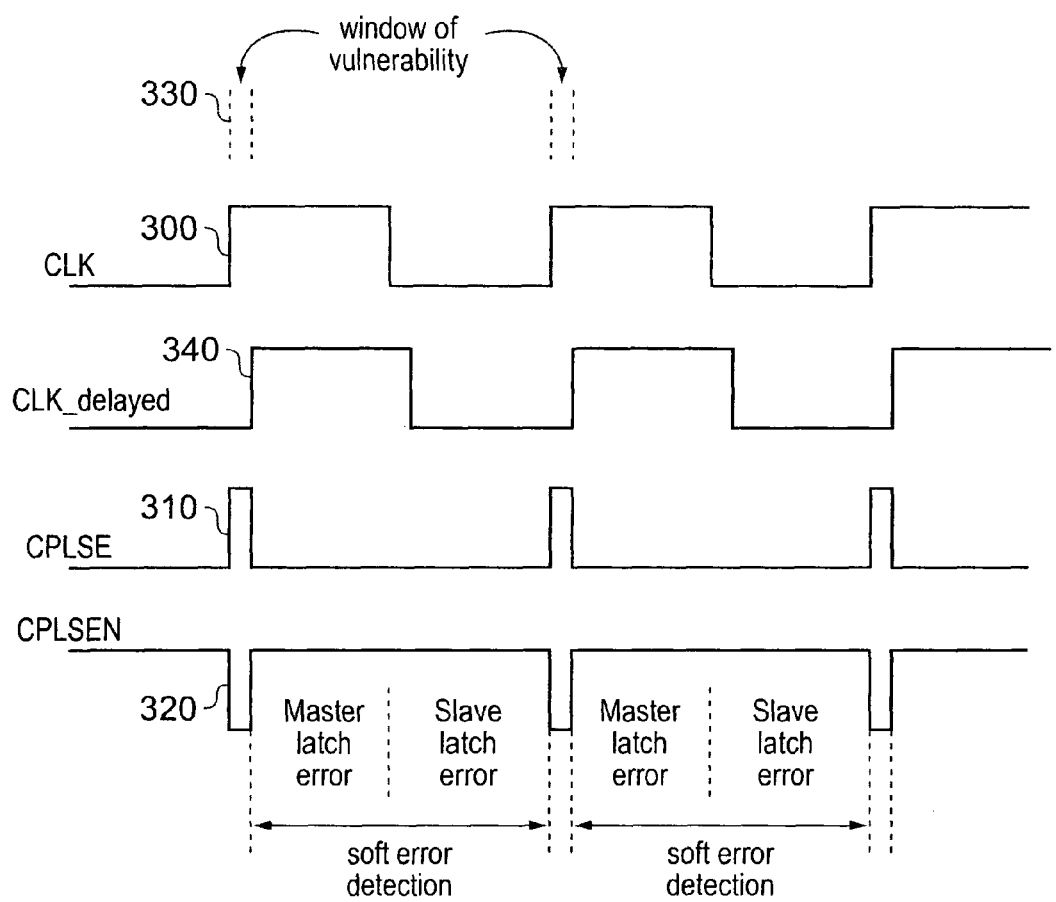

FIGS. 4 and 5 are timing diagrams illustrating two different ways in which the pulse based scheme can be used to capture soft errors. In both schemes, there is a window of vulnerability 330 where an error can go undetected. The window of vulnerability depends on where the clock pulse appears with respect to the clock signal. During this vulnerable phase, the error signal is gated by the CPLSEN signal to ensure no error signal is output. However, outside of this pulse, the circuit automatically compares Q with the value stored in the additional latch 130, such that in case of a neutron or alpha particle strike, if this causes a state flip, the error signal will then be asserted at a logic one value. This error signal can then be used at a system level to flush the error or to take any other necessary steps.

Considering first FIG. 4, in accordance with this scheme, a pulse 310 is generated at the rising edge 300 of the clock signal. The sampled value is stored in the additional latch 130 during this pulse period. When the data is being written in the master latch 100 as well as the additional latch 130, there is a window of vulnerability. If a particle strike happens during this window, the error might go undetected as both the master and the additional latch will store the wrong data. Since during this period the CPLSEN signal causes the error signal to be output at a logic zero level, then in one embodiment the output error value is latched just before the clock signal rises in order to ensure that that error value is not lost. In accordance with this scheme, it can be seen that the slave latch 120 is monitored for errors for the whole period that it is opaque (i.e. for the whole of the second phase of the clock cycle), but the master latch 100 is not monitored for a small portion of the period when it is opaque (at the start of the first phase of the clock cycle) when it is in the window of vulnerability 330.

The scheme shown in FIG. 5 moves the vulnerable period of time 330 to a time when the slave latch is opaque. In accordance with this scheme, the master latch 100 and slave latch 120 are arranged to operate off a delayed version of the clock 340. The data is latched in the additional latch 130 during the pulse, which is still generated from the rising edge of the non-delayed clock. Accordingly, using this scheme, the data is latched in the retention latch even before it is latched in the master latch 100. Accordingly, it is necessary to slightly modify the arrangement of FIGS. 2 and 3, so that the pulse driven switch 150, 224 takes its input from the input side of the master latch 100.

As shown in FIG. 5, the window of vulnerability 330 now moves to the opaque period of the slave latch, and in particular the final part of the second phase of the clock signal. In accordance with this scheme, the master latch 100 is monitored for the whole period that it is opaque, but the slave latch is not monitored for a small portion of the period that it is opaque, i.e. at the end of the second phase of the clock cycle.

The scheme of FIG. 5 has the advantage that if a strike happens during the vulnerable period, any erroneous data generated will not typically be captured in the next flip-flop stage at the far side of the combinatorial logic that receives its input from the affected flip-flop. In particular, any erroneous data input to the combinatorial logic at this late stage in the clock cycle will not typically have time to propagate through the combinatorial logic to the input of the flip-flop on the far side of the combinatorial logic, and accordingly the error will typically not propagate. However, a disadvantage of such a scheme is that the hold time of the flip-flop will increase by the amount that the clock signal is delayed.

Figure 6:
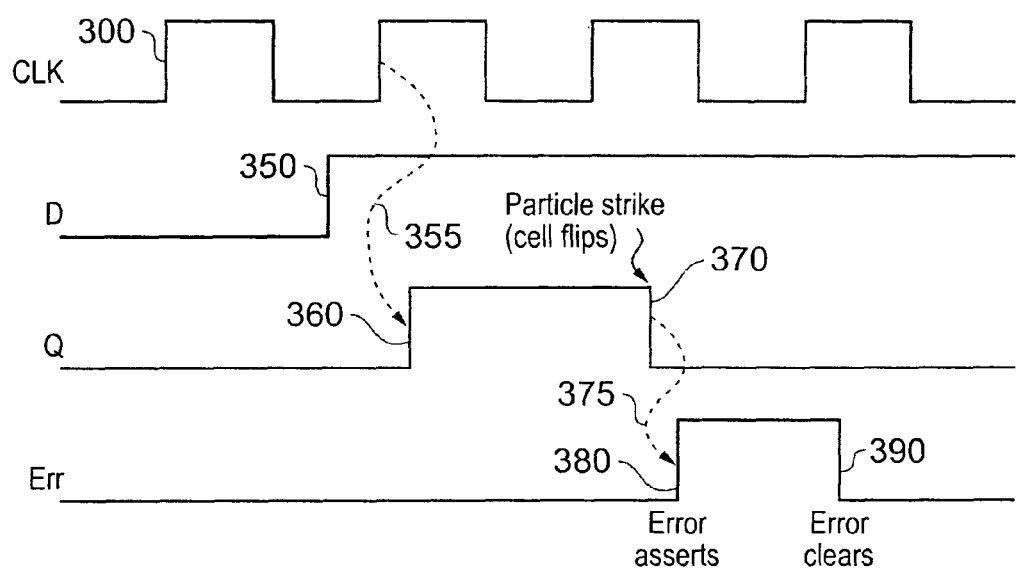
FIG. 6 is a timing diagram showing the timing behaviour of the sequential storage circuit of embodiments of the present invention.

For the remainder of the discussion herein, it will be assumed for simplicity that the clock pulse scheme shown in FIG. 4 is used. FIG. 6 shows the timing behaviour of the sequential storage circuit of FIG. 3. When the clock signal 300 transitions to a logic one value, the output value Q follows the input value D, as indicated by the dotted line 355. Accordingly, following a transition 350 in the input data value D, then following the next rising edge of the clock this transition will also be reflected in the output value Q as shown by the rising edge 360.

In the illustrated figure, a particle strike happens whilst the clock signal is at a logic one level, and hence the master latch is storing data. If the particle strike generates sufficient hole-electron pairs and creates enough charge to flip the master latch, the output value Q will also flip as shown by the transition 370, and will thus lead to an erroneous output value.

If this happens, then the error signal will also transition to a logic one level, as shown by the dotted line 375 and the rising edge 380 of the error signal. At the system level, this error signal can be latched outside of the flip-flop to generate an error signal. Following the next rising edge of the clock signal, a brief pulse will again be generated causing the CPLSEN signal to go low, and hence cause a transition of the error signal at time 390 back to the logic zero level.

It should be noted that, if a particle strike instead happened whilst the clock signal was at a logic zero level (whilst the slave latch is storing data), then if this causes the slave latch to flip, the data stored in the additional latch can still be used by the error detection logic to compare against, and accordingly an error signal will be generated in entirely the same way as shown in FIG. 6. Except for the vulnerable timing window described earlier, this architecture will detect any erroneous latch flipping during the clock period.

If a particle strikes the additional latch 130 and flips its state, then the error detection circuitry 160 will still assert an error. In this case, an error will hence be flagged even when there is no real state corruption, i.e. no corruption in the contents of the master or the slave latches 100, 120. To avoid this false positive situation arising, the retention latch can be made robust against soft errors. In particular, since the retention latch is not on the critical path, then there is a significant amount of design flexibility allowing any one of a number of known techniques to be used to make the additional latch robust to soft errors without any performance penalty. For example, the additional latch may be resized, in order to make it bigger, since bigger cells are more robust to soft errors. This will have a slight impact on the pulse duration needed to safely latch data into the additional latch 130. Alternatively, or in addition, if the additional latch is implemented by a pre-existing retention latch, then that additional latch will have its own separate power supply, and accordingly it is possible to run that additional latch at a higher voltage, thereby exponentially reducing the probability of a flip in state caused by a particle strike. This will however have an impact on latch power, stress and reliability.

As will be appreciated from the above discussions, the novel design of embodiments of the present invention enables soft errors to be detected in both the master and the slave latches by using only one additional latch. In particular, by using a pulse latching scheme in association with the additional latch, that single additional latch can be used to detect errors in both the master and the slave latches. Further, in contrast to the earlier-mentioned Razor-based approach, there is no minimum delay requirement in the proposed design, and hence no knock-on effects within the system.

In one embodiment, a pre-existing retention latch can be used to implement the additional latch, thereby reducing the overhead involved in implementing the techniques of embodiments of the present invention. In particular, since the retention latch is re-used, the overhead is limited to the addition of a few combinational gates to implement the error detection circuitry. This overhead is substantially less than the earlier-described prior art techniques for handling single event upsets in sequential storage circuits. Hence, in summary, by using techniques in accordance with embodiments of the present invention, it is possible to implement detection of single event upsets with very low area overhead when compared with the known prior art techniques. Further, the technique can be easily adapted to standard design flow and does not impose any additional requirements on the system. Further, the design is easily implemented in a retention based flip-flop design, with the addition of only a few additional combinational gates.

To implement the earlier-described embodiments of the present invention, it is necessary to supply a pulse signal to certain elements within the sequential storage circuitry. In accordance with an alternative aspect of the present invention, the inventors realised that the presence of this pulse could then be used to simplify other features of the sequential storage circuitry. In particular, it would be possible to replace the master and slave latches with one single main latch, and use the pulse signal to latch new data into that main latch. This scheme is shown schematically in FIG. 7. Accordingly, a single pulse driven main latch 410 is provided, along with a retention/soft error detection latch 420. As before, error detection circuitry 430 is used to detect occurrence of soft errors. In this system, a pulse driven switch 400 analogous to the pulse driven switch 150 in FIG. 2 is used to drive both the pulse driven main latch 410 and the retention/soft error detection latch 420. Again pulse generation logic 440 may be provided internally within the sequential storage circuit, or may be provided externally.

Figure 7:
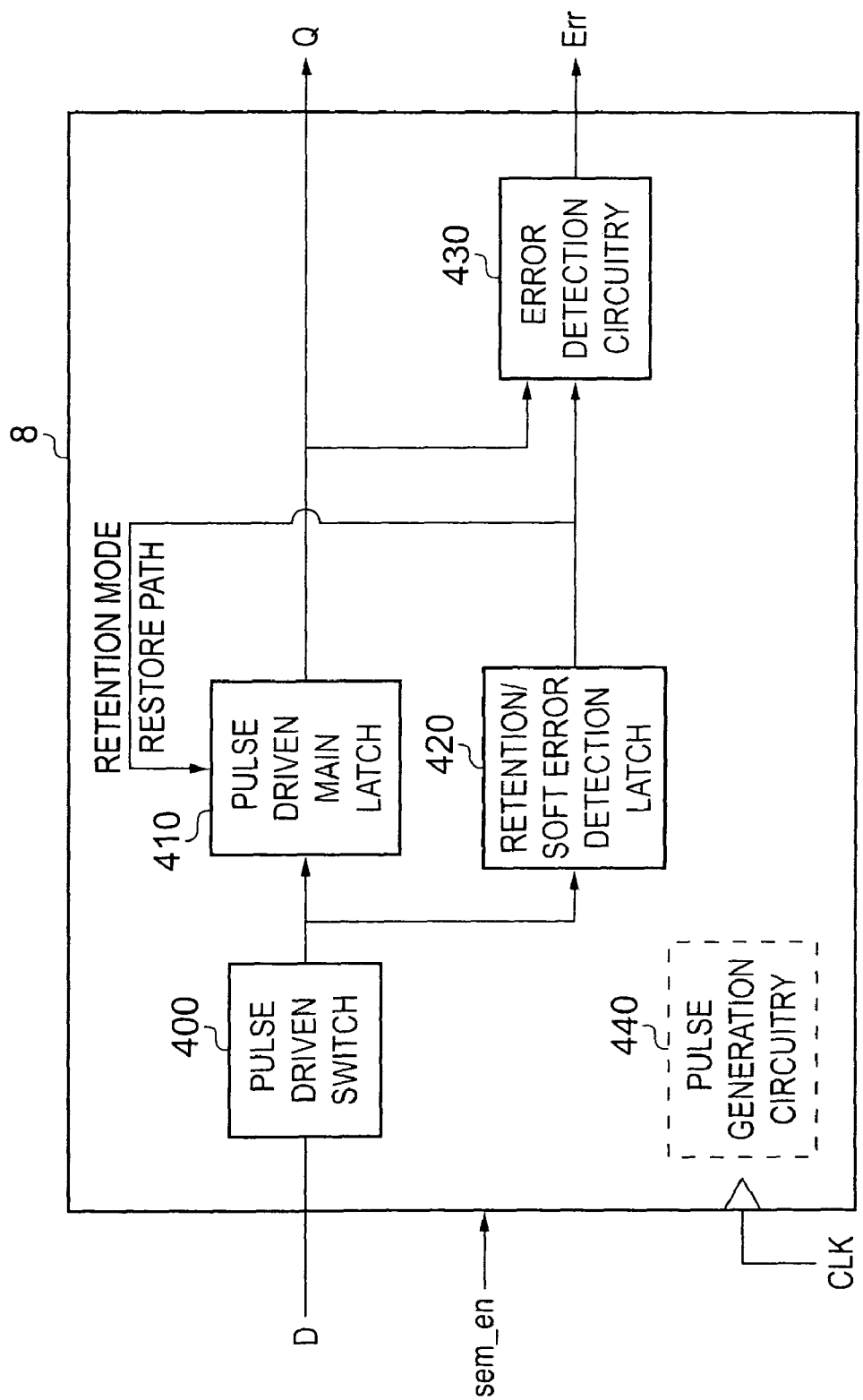
FIG. 7 is a block diagram illustrating a sequential storage circuit in accordance with an alternative embodiment of the present invention.
Figure 8:
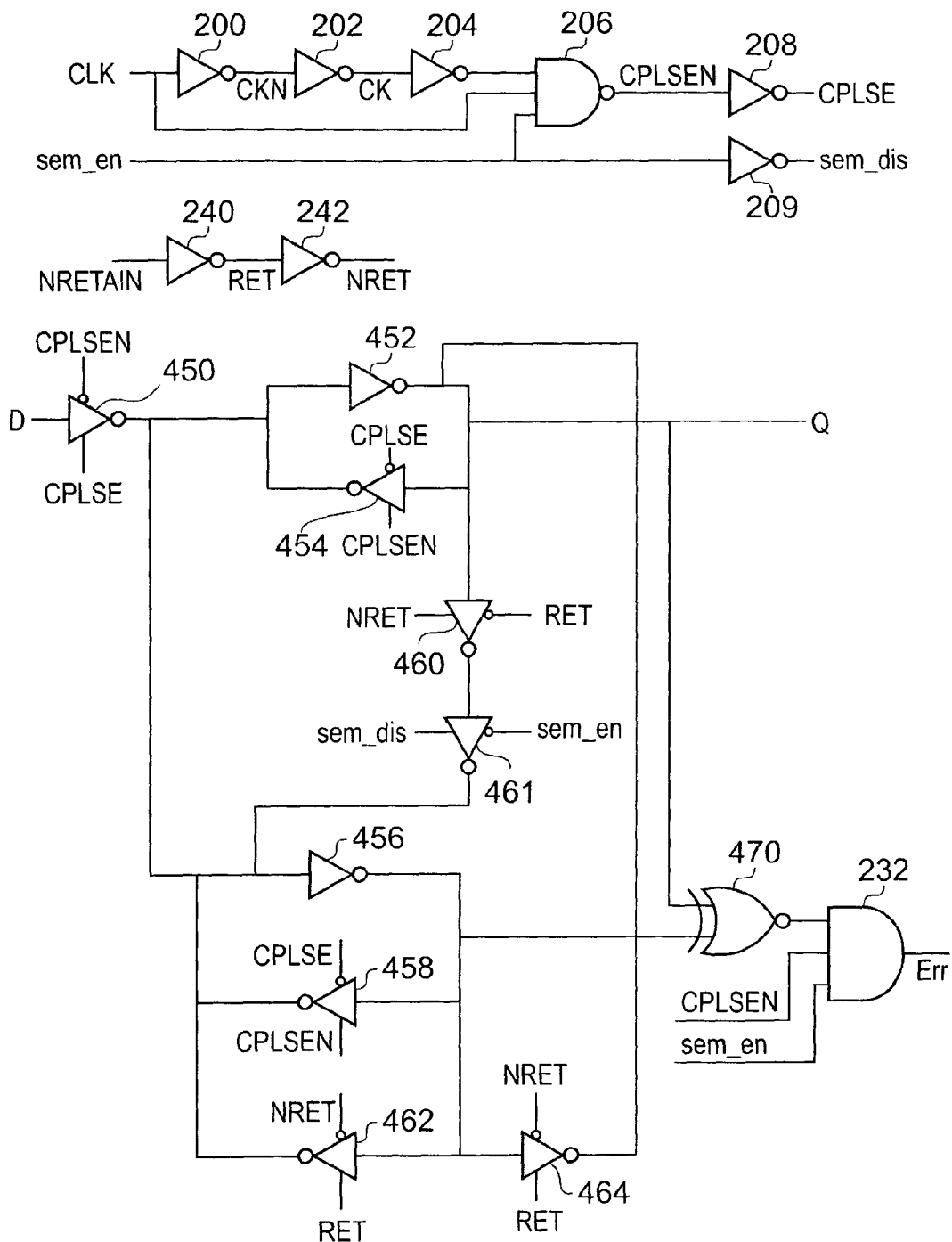
FIG. 8 is a circuit diagram illustrating one embodiment of the sequential storage circuit of FIG. 7.

FIG. 8 is a circuit diagram showing one embodiment of the sequential storage circuit of FIG. 7. Those elements which are unchanged with respect to the elements shown in the earlier embodiment of FIG. 3 are indicated with the same reference numerals. Accordingly, it can be seen that the pulse generation circuitry is unchanged, as are the elements 240, 242 used to generate the various signals used in the retention mode. The error detection circuitry is similar to that used in FIG. 3, but the XNOR gate 230 of FIG. 3 is replaced here with an XOR gate 470, given the matched number of inversions on the two input paths to the XOR gate. It will be appreciated that if in another embodiment the number of inverters on each path were instead mismatched, an XNOR gate would be used instead of XOR gate 470.

The circuit element 450 forms the pulse driven switch 400, the elements 452, 454 form the pulse driven main latch 410, and the elements 456, 458, 462 form the retention/soft error detection latch 420. When the pulse signal goes high, switch 450 turns on and the switch 454 turns off, the main latch then becoming transparent and routing the input data value D to the output Q. At this time, the switch 458 is also turned off, and accordingly the input value D is also routed via the circuit element 456 to the second input of the XOR gate 470.

When the pulse signal ends, switch 450 turns off, and switches 454, 458 turn on, such that the main latch 410 and the retention/soft error detection latch 420 at that time become opaque and store a representation of the input data value D. For the remainder of the clock period, the error detection circuitry 470, 232 then detects any difference in the data values stored in the main latch and the additional latch, triggering the error signal on detection of any such disparity.

In retention mode, the components 460, 461, 462 and 464 operate in an analogous manner to the components 244, 245, 246, 248 discussed with reference to FIG. 3, such that on occurrence of the power saving operation, the retention latch stores a representation of the input value, which is then returned to the pulse driven main latch when the power saving operation is exited. It can be seen that such an approach employs the same basic SEU error detection mechanism as the earlier described embodiments of the present invention, but allows a simplification in the other components of the sequential storage circuit.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. Sequential storage circuitry for an integrated circuit, comprising:
    a first storage element for storing, during a first phase of a clock signal, a first indication of an input data value received by the sequential storage circuitry;
    a second storage element coupled to an output of the first storage element, for storing a second indication of the input data value during a second phase of the clock signal;
    an additional storage element for storing a third indication of the input data value on occurrence of a pulse signal derived from the clock signal; and
    error detection circuitry for detecting a single event upset error in either the first storage element or the second storage element by:
    (i) during the first phase of the clock signal, detecting the single event upset error in the first storage element if there is a difference in the input data value as indicated by said first indication and said third indication; and
    (ii) during the second phase of the clock signal, detecting the single event upset error in the second storage element if there is a difference in the input data value as indicated by said second indication and said third indication.

2. Sequential storage circuitry as claimed in claim 1, wherein the error detection circuitry is arranged to generate an error signal on detection of said single event upset error, but is arranged to suppress generation of the error signal during the occurrence of said pulse signal.

3. Sequential storage circuitry as claimed in claim 2, wherein the pulse signal is generated in response to the start of the first phase of the clock signal, and no error signal is produced for any single event upset error occurring in the first storage element during occurrence of the pulse signal.

4. Sequential storage circuitry as claimed in claim 2, wherein the pulse signal is generated just prior to the end of the second phase of the clock signal, and no error signal is produced for any single event upset error occurring in the second storage element during occurrence of the pulse signal.

5. Sequential storage circuitry as claimed in claim 2, wherein the value of the error signal output by the error detection circuitry is latched immediately before generation of the pulse signal.

6. Sequential storage circuitry as claimed in claim 1, wherein:
    said additional storage element is operable in either a single event upset error detection mode or a state retention mode;
    in the single event upset error detection mode the additional storage element storing the third indication of the input data value on occurrence of the pulse signal derived from the clock signal; and
    in the state retention mode, the additional storage element being arranged to store an indication of the input data value when power is removed from the first and second storage elements but not the additional storage element, the error detection circuitry not being used in the state retention mode.

7. Sequential storage circuitry as claimed in claim 1, wherein the additional storage element is designed to be robust to single event upset errors, thereby reducing the likelihood of the error detection circuitry detecting a difference in the input data value due to a single event upset error occurring in the additional storage element.

8. Sequential storage circuitry as claimed in claim 1, wherein:
    the error detection circuitry is coupled to an output of the second storage element;
    during the first phase of the clock signal, the second storage element being transparent such that the output of the second storage element during the first phase of the clock cycle represents the first indication of the data value stored in the first storage element, whereby the error detection circuitry is arranged to detect a single event upset error in the first storage element during said first phase of the clock signal;
    during the second phase of the clock signal, the second storage element being opaque such that the output of the second storage element during the second phase of the clock cycle represents the second indication of the data value stored in the second storage element, whereby the error detection circuitry is arranged to detect a single event upset error in the second storage element during said second phase of the clock signal.

9. Sequential storage circuitry as claimed in claim 1, further comprising:
    pulse generation circuitry for generating the pulse signal from a predetermined clock edge of the clock signal.

10. An integrated circuit comprising a plurality of sequential storage circuits interposed by combinatorial circuitry, at least one of the sequential storage circuits comprising:
    a first storage element for storing, during a first phase of a clock signal, a first indication of an input data value received by the sequential storage circuit;
    a second storage element coupled to an output of the first storage element, for storing a second indication of the input data value during a second phase of the clock signal;
    an additional storage element for storing a third indication of the input data value on occurrence of a pulse signal derived from the clock signal; and
    error detection circuitry for detecting a single event upset error in either the first storage element or the second storage element by:
    (i) during the first phase of the clock signal, detecting the single event upset error in the first storage element if there is a difference in the input data value as indicated by said first indication and said third indication; and
    (ii) during the second phase of the clock signal, detecting the single event upset error in the second storage element if there is a difference in the input data value as indicated by said second indication and said third indication.

11. An integrated circuit as claimed in claim 10, wherein the error detection circuitry is arranged to generate an error signal on detection of said single event upset error, but is arranged to suppress generation of the error signal during the occurrence of said pulse signal, the integrated circuit further comprising:
    an error signal latch coupled to the output of each of said at least one of the sequential storage circuits, said error latch being arranged to latch the value of the error signal output by the error detection circuitry immediately before generation of the pulse signal.

12. A method of detecting a single event upset in sequential storage circuitry of an integrated circuit, the sequential storage circuitry comprising a first storage element, a second storage element coupled to an output of the first storage element, and an additional storage element, the method comprising the steps of:

storing in the first storage element, during a first phase of a clock signal, a first indication of an input data value received by the sequential storage circuitry;

storing in the second storage element, during a second phase of the clock signal, a second indication of the input data value;

storing in the additional storage element, on occurrence of a pulse signal derived from the clock signal, a third indication of the input data value; and detecting a single event upset error in either the first storage element or the second storage element by:

(i) during the first phase of the clock signal, detecting the single event upset error in the first storage element if there is a difference in the input data value as indicated by said first indication and said third indication; and (ii) during the second phase of the clock signal, detecting the single event upset error in the second storage element if there is a difference in the input data value as indicated by said second indication and said third indication.

* * * * *